United States Patent [19]
Zajicek

[11] Patent Number: 5,029,292
[45] Date of Patent: Jul. 2, 1991

[54] SILICONE/ZIRCONIUM BALL FOR USE IN A CURSOR CONTROL DEVICE

[75] Inventor: Lada Zajicek, Fremont, Calif.

[73] Assignee: Apple Computer, Inc., Cupertino, Calif.

[21] Appl. No.: 255,767

[22] Filed: Oct. 11, 1988

[51] Int. Cl.⁵ .............................................. G09G 5/08
[52] U.S. Cl. ................................ 340/710; 74/471 XY
[58] Field of Search ................. 340/706, 709, 710; 74/471 XY; 273/148 B; 264/331.11, 60–62; 501/46, 49; 524/549, 588, 434, 723; 427/387

[56] References Cited

U.S. PATENT DOCUMENTS

| | | | |
|---|---|---|---|
| 3,862,065 | 1/1975 | Yokokawa et al. | 264/331.11 |
| 3,917,648 | 11/1975 | McLeod | 524/434 |
| 4,154,618 | 5/1979 | Burke | 524/549 |
| 4,352,889 | 10/1982 | Takami et al. | 501/49 |
| 4,464,652 | 8/1984 | Lapson et al. | 340/710 |
| 4,777,087 | 10/1988 | Heeks et al. | 524/723 |
| 4,806,391 | 2/1989 | Shorin | 427/387 |
| 4,925,895 | 5/1990 | Heeks et al. | 524/723 |
| 4,951,034 | 8/1990 | Mazzone et al. | 340/710 |

*Primary Examiner*—Jeffery A. Brier
*Assistant Examiner*—Richard Hjerpe
*Attorney, Agent, or Firm*—Blakely, Sokoloff, Taylor & Zafman

[57] ABSTRACT

A substantially spherical ball to be used in a cursor controlling mouse. The mouse ball is formed from a composition of silicone having zirconium dust dispersed uniformly throughout. The zirconium provides the added weight necessary to keep the ball rolling on a working surface, but is not sufficiently conductive to short electrical components in mouse. The uniform composition provides for the mouse ball to have its gravitational center coincident with its geometric center to inhibit cursor jitter when the mouse is manually moved.

13 Claims, 2 Drawing Sheets

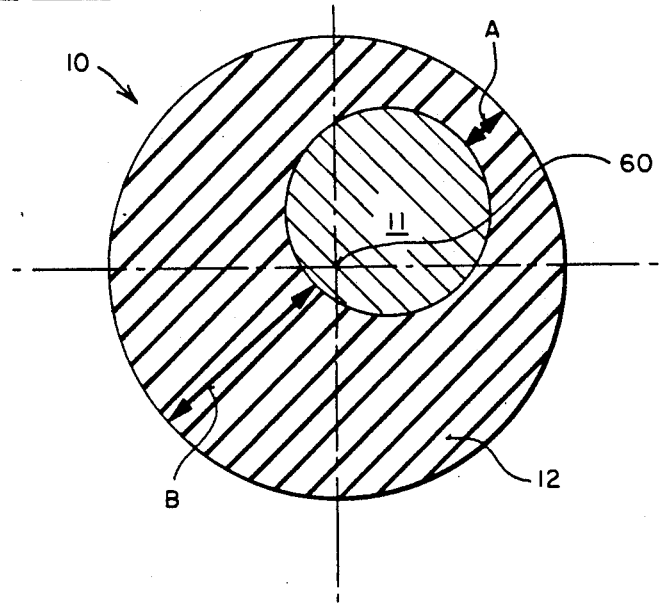
FIG_1 (PRIOR ART)
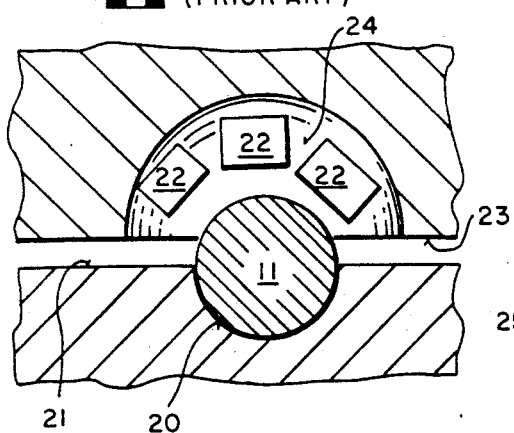
FIG 2 (PRIOR ART)
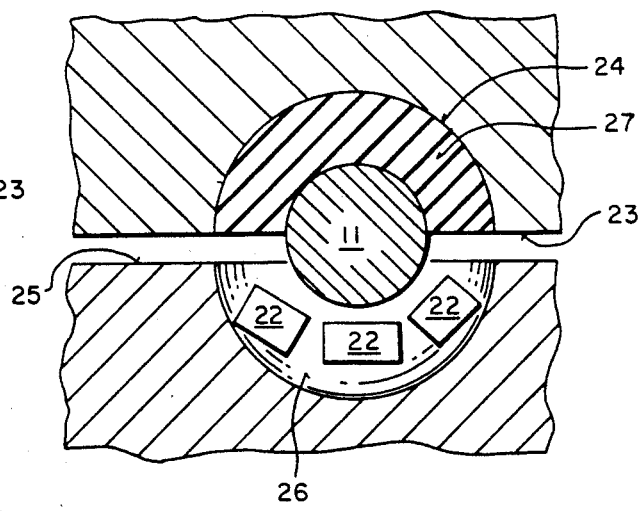
FIG 3 (PRIOR ART)
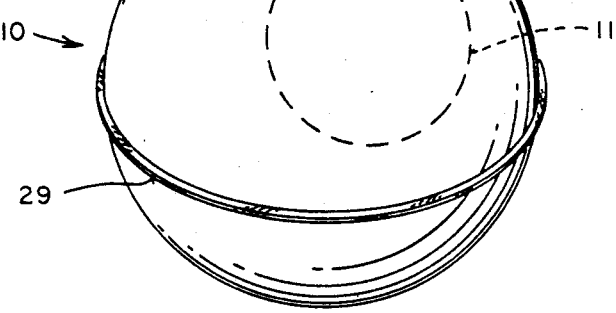
FIG 4 (PRIOR ART)

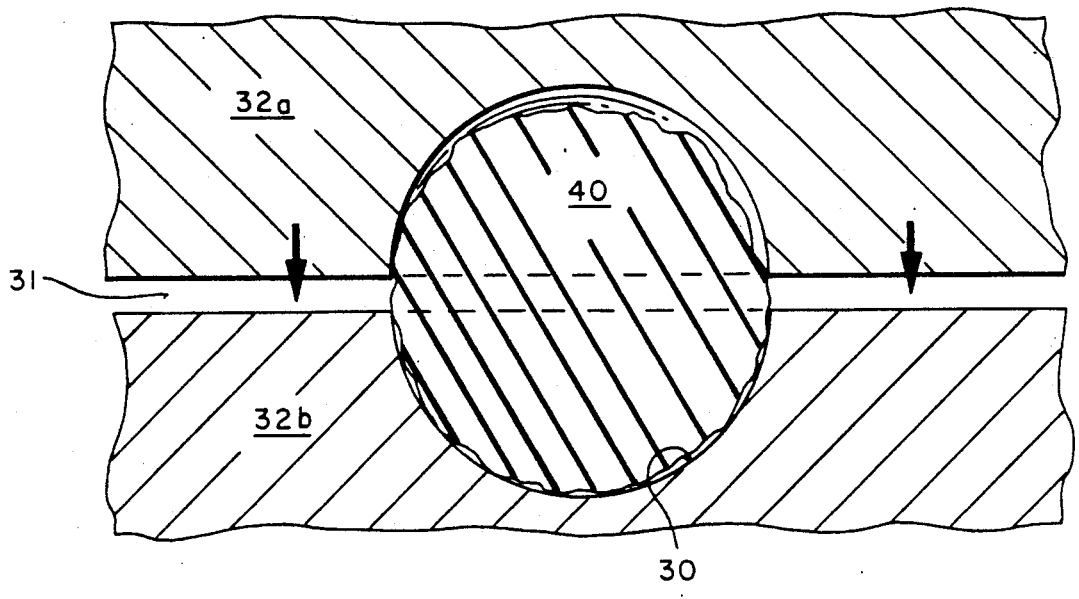
FIG_5
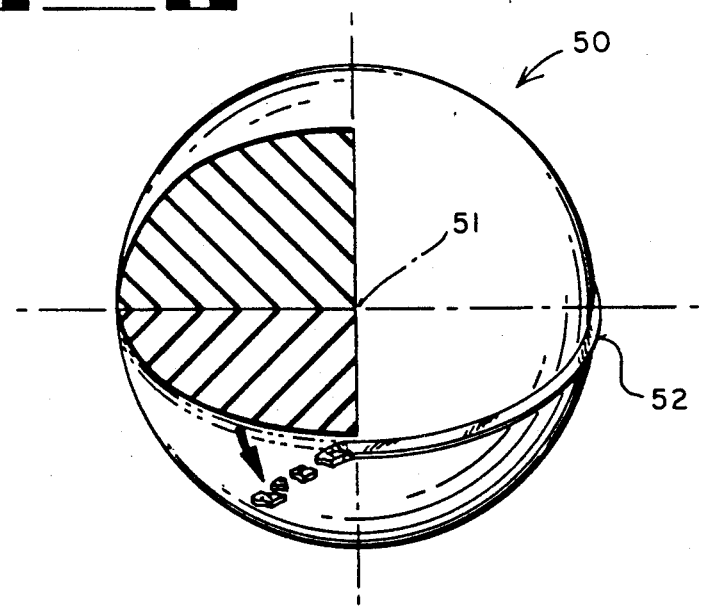
FIG_6

SILICONE/ZIRCONIUM BALL FOR USE IN A CURSOR CONTROL DEVICE

BACKGROUND OF THE INVENTION

1. Field of the Invention

The present invention relates to the field of cursor control devices for video displays, commonly referred to as a "mouse", and more particularly to a rotatable ball used in the mouse.

2. Prior Art

In many video display systems for computers it is desirable to control the positioning of a cursor on a video display screen by means other than a keyboard. Joy-stick controllers and rotating, tracking balls are just two examples of devices for controlling the positioning of a cursor on the display screen. Another commonly used cursor controlling device is referred to as a "mouse".

In a common embodiment of a mouse, a hand-held housing encases a substantially spherical ball which is free to rotate within the housing. The ball is also free to "float" in the vertical direction within the housing, but remains in contact with a working surface during use. When the mouse is placed onto the working surface, which is typically a friction pad, the ball makes contact with this working surface and rotates as an operator manually moves the mouse over the working surface. The mechanical movement of the mouse causes the ball to rotate within the housing of the mouse, wherein the direction of ball movement is relative to the mouse movement. The ball movement is then translated to electrical signals for controlling the position of the cursor.

In a typical mouse, roller shafts are located within the housing and are in contact with the ball. The rotation of the ball causes one or more roller shafts to rotate. The roller shafts are mechanically coupled to a photo-emitter and a photo-detector to convert the mechanical motion of the roller shaft to electrical signals. The output from the photo-detector provides the necessary translation for providing the cursor movement on the display screen corresponding to the mechanical movement of the mouse. One such example of a mouse is disclosed in U.S. Pat. No. 4,464,652.

Although improvements have been made to the mouse, the improvements were typically centered on the electrical-mechanical aspects of the mouse. However, a major disadvantage resides in the balls utilized with most mice. One such disadvantage of prior art mouse balls relates to the location of the center of gravity of a given ball. That is, the ball's center of gravity is at a point other than the actual geometric center of the substantially spherical ball. Whenever the ball's center of gravity is not at its geometric center, the ball will have a tendency of not rolling uniformly.

To illustrate, it is useful to visualize the ball rotated in place about its geometric center and above a reference plane created by the working surface. As the ball is rotated, the gravitational center point of the ball is located at different points in relation to the reference plane. The gravitational force between the working surface and the ball will either pull the ball towards the surface in the direction of the rotational movement or pull the ball in the opposite direction of the rotational movement. Depending on the direction of rotation and the location of the gravitational center in reference to the geometric center, the gravitational force will either increase or decrease the rotational velocity of the ball as it is rotated.

Therefore, when a user directs the mouse to move along the working surface, the ball's rotational velocity will vary periodically due to the above described defect and without regard to the speed at which the user moves the mouse. This causes the ball to "jump" along the working surface, which in turn causes the roller shafts to respond accordingly. This "jumping" or "jitter" effect causes the cursor to respond with a dis-continuous movement on the screen. As a result, an operator moving the mouse at a constant velocity will see the cursor moving at a varying velocity on the screen, instead of the desired constant velocity movement of the cursor. The amount of the variance of the velocity will dependent on the distance differential between the geometric center and the gravitational center of the ball. The operator will notice the cursor to "jitter" as it is moved across the display screen.

The above described problem, which is associated with some of the prior art balls, results because these balls are comprised of an inner core and an outer core (outer covering) surrounding the inner core. An inner core is necessitated by a requirement of having minimum weight associated with these mouse balls. Because the ball is free to "float" within the housing, a certain specified minimum weight is required for it to maintain frictional contact with the working surface. Below a minimum specified weight, the balls will "float" upwards from the working surface and will not rotate as the mouse is moved across the working surface.

The inner core is comprised of a material which provides the necessary weight. The outer core is comprised of a lighter weight material which is more suited for providing the surface which makes contact with the working surface. Also, it is essential that this outer surface be non-conductive, so that the ball does not become an electrical conductor within the mouse or between an electrical part of the mouse and the working surface.

During construction of these type of prior art balls, having an inner core and an outer covering, it is difficult to match the geometric and gravitational centers of the inner core and the outer covering. This problem associated with the coincidence of the center of gravity to the geometric center of the above described prior art ball has necessitated the testing of the ball to determine if the gravitational center is so removed from the geometric center as to cause the earlier described "jumping" phenomena to be noticeable. To make such a determination, each ball must be tested individually, such as by watching the ball's rotational action across a flat surface or actually using the ball within a mouse and watching the cursor response on a display screen. Such testing techniques are costly and time consuming. In addition, balls which do not meet the requisite criteria are deemed unacceptable and discarded. This discarding of unacceptable balls impacts on manufacturing production yield, leading to added manufacturing costs.

As a result, a uniform composition ball not having an inner core is desired. However, such a ball, which has uniform composition, must still meet the minimum weight requirement for use in a given prior art mouse. The ball must also have a non-conductive surface, so that it does not cause the mouse to electrically "short out". Conventional black rubber balls could possibly be adapted to meet this requirement, assuming that the density of the rubber is such that it meets the minimum weight requirement, however, conventional black rubber has a distinct disadvantage in that it tends to leave black marks on the working surface. Further it has the characteristically unpleasant odor associated with rubber.

Accordingly, it is appreciated that what is needed is a uniform composition, non-conducting mouse ball made from a material or materials other than black rubber, and has sufficient density to function as a mouse ball.

SUMMARY OF THE INVENTION

A solid silicone/zirconium ball to be used in conjunction with a mouse and a process utilizing compression molding to shape silicone/zirconium material into the substantially spherical mouse ball of the present invention are described. In the preferred embodiment, the ball is comprised of zirconium dust dispersed uniformly in silicone. Zirconium is mixed with the silicone to provide added weight to the silicone, so that a given size mouse ball will have the requisite minimum weight. This minimum weight for a mouse ball is necessary to prevent the ball from being pulled upwards when it is rolled across the working surface.

In the preferred embodiment, zirconium dust is uniformly disbursed throughout the silicone during its formation such that a uniform material of silicone/zirconium is formed. Sufficient mass of this silicone/zirconium material is placed in a spherical cavity of a compression mold and is subjected to compression molding under heat. Then it is allowed to cool into a solid and, if necessary, excess material formed at the junction of the mold is removed. The composition ratio of silicone and zirconium of the mouse ball of the preferred embodiment is 44%-50% silicone to 56%-50% zirconium. Zirconium provides the additional weight but does not function as a conductor to disrupt the operation of the electrical apparatus within the mouse.

BRIEF DESCRIPTION OF THE DRAWINGS

FIG. 1 is a cross-sectional diagram of a prior art mouse ball having an inner core and an outer core or covering.

FIG. 2 is a cross-sectional diagram illustrating the prior art technique of forming one hemisphere of the outer core over the inner core.

FIG. 3 is a cross-sectional diagram illustrating the prior art technique of forming the other hemisphere of the outer core over the inner core.

FIG. 4 is a pictorial diagram showing a completed prior art mouse ball.

FIG. 5 is a cross-sectional diagram illustrating the technique of forming a unitary mouse ball of the present invention.

FIG. 6 is a pictorial diagram of the mouse ball of the present invention and showing a cut away view to expose the center of the spherical mouse ball.

DETAILED DESCRIPTION OF THE INVENTION

A silicon rubber ball for use in conjunction with a cursor control device and a process utilizing compression molding to shape a silicon rubber and zirconium alloy into a substantially spherical ball are described. In the following description, numerous specific details are set forth, such as specific structures, etc., in order to provide a thorough understanding of the present invention. It will be obvious, however, to one skilled in the art that the present invention may be practiced without these specific details. In other instances, well-known processes have not been described in detail in order not to unnecessarily obscure the present invention.

PRIOR ART

Referring to FIG. 1, a prior art mouse ball 10, having an inner core 11 and an outer core 12 is shown. Inner core 11 is substantially spherical in shape and is typically formed from a metal or a metal alloy. The outer core (outer covering) 12 is then formed completely enclosing inner core 11. Outer core 12 is also substantially spherical in shape. Ideally, the geometric center of core 12 is also the geometric center 60 of ball 10. Geometric center of inner core 11 should also coincide with the geometric center 60. Inner core 11 provides the ball 10 with sufficient weight so that the ball 10 will make sufficient contact with the working surface and will overcome any frictional force between the ball and roller shafts (not shown) located within the mouse. This frictional force between the ball and the roller shafts tends to pull the ball into the mouse housing and away from the working surface. In a common embodiment, core 11 is comprised of zinc and outer core 12 is comprised of a silicon layer.

A two-step prior art process for forming the ball 10 is shown in FIGS. 2 and 3. A heated, dual hemisphere compression mold is employed. In the first step, the metallic core 11, having been previously formed, is positioned within a cavity 20 of a first mold 21. Cavity 20 is shaped to contain a hemisphere of core 11. It is presumed that core 11 is substantially spherical and is also of uniform composition such that the geometric and gravitational centers are located at the same point. The diameter of the core 11 and the diameter of cavity 20 are substantially equivalent.

Next, cubes of solid silicone 22 are positioned in a cavity 24 of a second mold 23. Mold 23 mates to mold 21, such that the exposed hemisphere of core 11 is centrally disposed within cavity 24. Cavity 24 has a diameter equivalent to the desired diameter of the ball 10 and is shaped to form one hemisphere of ball 10. As the molds 21 and 23 are mated and compressed together under heat, cubes of silicone 22 are compressed to the shape of cavity 24. Because cavity 24 is shaped to provide one hemisphere of the ball 10, ideally, a mantle of silicone is formed about one hemisphere of inner core 11.

In the second step shown in FIG. 3, the first mold 21 is removed and replaced with a third mold 25 which also mates with the second mold 23. The third mold 25 has a cavity 26 which has the same diameter as cavity 24. Cavity 24 contains the formed silicone 27 and core 11. As in the first step, cubes of solid silicone 22 are positioned within the cavity 26 of the third mold 25. The second and third molds 23 and 25 are compressed together under heat and this compression causes the cubes of silicone 22 to form a mantle about the exposed half of inner core 11 residing in cavity 26.

The compression molding process causes the silicone halves in cavities 24 and 26 to join together to form a uniform sphere. When the ball 10 is removed from the second and third molds 23 and 25, it may have a ridge 29 at the joining of the two molds 23 and 25. This ridge 29 can be readily removed by various prior art techniques, such as putting the ball 10 in a sanding device. When the ball 10 is formed, it is ideal to have the inner core 11 centered within the outer core 12 formed by the two silicone halves. That is, ideally the geometric center 60 of the ball 10, which is also the geometric center of outer core 12, should be the geometric center of inner core 11. Assuming that inner core 11 and outer core 12 are uniform so that each has its center of gravity at its geometric center, then, when the centers of inner core 11 and outer core 12 coincide, the geometric and gravitational centers of the ball 10 will be coincident.

However, in practice this is difficult to achieve using the compression molding technique of FIGS. 2 and 3. In the first step shown in FIG. 2, inner core 11 rests solidly within cavity 20 and is held in place during the first compression step. During the second compression molding step shown in FIG. 3, inner core 11 is not supported by the surface of either cavity 24 or 26. One half of the inner core 11 resides upon formed silicone 27 in cavity 24 and the other half of inner core 11 resides upon cubes of silicone 22 in cavity 26. During the second compression moldings step, inner core 11 is freely disposed to move about, because the heated silicone is deformed when heated. Therefore, in many instances core 11 shifts sufficiently such that its center shifts from the actual center 60 of the ball 10.

The undesired displacement of inner core 11 is shown by a dotted line in FIG. 4. The extent of this shift cannot be noticed by visual inspection. This shifting of inner core 11 is also shown in FIG. 1, wherein the end result is an inner core 11 that is closer to one outer surface of the ball 10, as shown by distance A, than it is to another outer surface of the ball 10 as shown by distance B. In effect, the center of inner core 11 does not coincide with the center 60 of the ball 10 such that the gravitational center of the ball 10 does not coincide with its geometric center. The two step prior art process is necessary to enclose a heavier inner core by a electrically non-conductive material, such as silicone.

An alternative to the dual core mouse ball of the prior art is to use a ball having a uniform composition throughout, so as not to have the problem of centering the inner core to the center of the ball. However, it is essential that the uniform composition be of sufficient weight for a given size ball so as to function properly as a mouse ball.

THE PRESENT INVENTION

The present invention provides for a mouse ball which does not require an inner core but has sufficient weight to utilize the gravitational force to remain in permanent contact with a working surface. The mouse ball of the present invention is a substantially spherical ball formed from a uniform material. The mouse ball of the present invention is comprised of silicone, but having zirconium dispersed throughout. Silicone is generally derived from reacting organic groups with silicon and polymerizing it. This is well-known in the prior art. Silicones are frequently used as "rubbers" for gaskets and electrical insulators. Therefore silicone is also referred to as "silicone rubber" or "silicone rubber". For example, for a substantially spherical mouse ball having a diameter of approximately 25 millimeters (mm) silicone alone cannot provide the requisite weight for the ball to function properly. In order to have the sufficient weight, zirconium is added to the silicone to meet the requisite minimum weight.

In order to achieve uniform dispersion of zirconium throughout the silicone/zirconium is ground to a fine powder or dust and is added to the silicone during its formation. The formation of silicone, such as cubes 22 in the prior art FIGS. 2 and 3 is well-known. However, during the formation of silicone, zirconium dust is added to the silicone and is then allowed to harden. Because of the fine form of zirconium dust, it disperses uniformly throughout the silicone such that the combination of zirconium and silicone forms a uniform silicone/zirconium composition. It is to be appreciated that catalysts, plasticizers and heat stabilizers are also provided during this process to form a solid silicone/zirconium material.

In the practice of the present invention, it has been found that a certain amount of zirconium to silicone is necessary to obtain the requisite minimum weight. However, when the percentage of zirconium to silicone increases beyond a certain value, the material exhibits characteristics more of a conductor and is not acceptable for use as a mouse ball. A composition percentage of approximately 44%–50% silicone and approximately 56%–50% zirconium to needed to form the silicone/zirconium material used in the formation of the mouse ball of the present invention. That is, a ratio of approximately 44%–50% silicone to 56%–50% zirconium has been found to achieve the minimum requisite weight, but not having the composition sufficiently conductive to cause a short circuit path in the electrical circuitry.

Referring to FIG. 5, silicone/zirconium material 40 described above is placed within a spherical cavity 30 formed within a dual hemisphere compression mold. One hemisphere of cavity 30 is disposed within mold 32a and the other hemisphere of cavity 30 is disposed within mold 32b. Cavity 30 is shaped so that when molds 32a and 32b are mated, it forms a substantially spherical cavity corresponding to the size of the desired mouse ball.

The silicone/zirconium material 40 is initially placed within the portion of cavity 30 formed within mold 32b. Then, mold 32a is placed to mate to mold 32b. The shape of silicone/zirconium material 40 can be irregular, but it must have sufficient mass to completely fill cavity 30. In actual practice, more material 40 than that which is required to fill cavity 30 is used during each compression molding process. Then, the two molds 32a-b are mated together to undergo a compression molding process under heat. The solid material 40 will be deformed to fill cavity 30. The excess material will be pressed out from the cavity 30 along the junction 31 of the molds 32a-b. Prior art techniques for compression molding under heat can be used to compression mold silicone/zirconium material 40.

Then, silicone/zirconium material 40 is cooled, allowing it to solidify. Once solidification has occurred, the substantially spherical material 40 is then removed from the cavity 30. The silicone/zirconium material 40 has been formed by the compression molding process into a substantially spherical ball 50. A ridge 52, formed due to the excess material escaping from cavity 30 at the junction 31 of the molds 32a-b, is removed by various prior art techniques. For example, one preferred technique is the use of a conventional industrial sanding/shaking machine, wherein ball 50 is placed in this sander and the shaking action of the machine causes the sanding away of ridge 52 to provide a substantially spherical ball 50. Because of the uniform composition of ball 50, the gravitational center is substantially at the geometric center 51 of the ball 50. The ball 50 of the preferred embodiment will have an approximate diameter of 25.40±0.12 mm and an approximate weight of 25±2 grams. Further, the preferred embodiment uses dimethyl silicone as one form of silicone.

It is to be appreciated that although the preferred embodiment describes a specific mouse ball, it is for illustrative purpose only and is not for the purpose of limiting the present invention. Further, other low-conductive substances which are heavier than silicone can be utilized with silicone to provide a mouse ball of the present invention, without departing from the spirit and scope of the present invention. However, because of the need to use low or non-conductive materials, highly conductive metals or metal alloys, such as copper, lead and stainless steel, cannot be used as dust particles dispersed in the silicone. Additionally, the silicon/zirconium ball of the present invention is not black in color such that it will not leave black marks upon a working surface, unlike the black rubber balls; and further, does not have the characteristic unpleasant odor of rubber.

I claim:

1. A substantially spherical mouse ball for use in a cursor control device comprising a mouse, said mouse ball comprising:
   silicone;
   a material substantially uniformly dispersed throughout said silicone, said material having a density substantially greater than said silicone, said material having sufficiently low electrical conductivity for use in said cursor control device, and said silicone and said material combination mixed with sufficient amounts of each such that said spherical ball of predetermined size has sufficient weight to be used in said cursor control device.

2. The substantially spherical mouse ball of claim 1, wherein said material is zirconium.

3. The substantially spherical mouse ball of claim 2, wherein the composition of said ball is approximately 44% to 50% silicone and 56% to 50% zirconium.

4. The substantially spherical mouse ball of claim 2, wherein said mouse ball is approximately 25.28 to 25.52 mm in diameter.

5. The substantially spherical mouse ball of claim 4, wherein said mouse ball is approximately 23 to 27 grams in weight.

6. A substantially spherical mouse ball for use in a mouse for controlling a cursor in a computer display system, said mouse ball consisting of:
   silicone;
   a material substantially uniformly dispersed throughout said silicone, said material having a density substantially greater than said silicone, said material having sufficiently low electrical conductivity for use in said mouse, said silicone and said material being mixed with sufficient amounts of each such that said spherical ball of predetermined size has sufficient weight to be used in said mouse.

7. A substantially spherical mouse ball of claim 6 wherein said material is zirconium.

8. A substantially spherical mouse ball of claim 7 wherein the composition of said ball is approximately 44% to 50% silicone and 56% to 50% zirconium.

9. A substantially spherical mouse ball of claim 8 wherein said mouse ball is approximately 23 to 27 grams in weight.

10. A mouse for controlling a cursor in a computer display system, said mouse comprising:
    a hand-held housing which is moved by the user of said computer display system to control movement of the cursor;
    a plurality of roller shafts located in said hand-held housing, said roller shafts rotating relative to the movement of said hand-held housing;
    a photodetector and photo emitter means being mechanically coupled to said plurality of roller shafts to translate the rotation of said roller shafts into electrical signals for controlling the position of the cursor;
    a substantially spherical mouse ball located in said hand-held housing and being in contact with said plurality of roller shafts, said mouse ball rotating relative to the movement of said hand-held housing to cause movement of said plurality of roller shafts;
    wherein the improvement comprises:
    said mouse ball consisting of:
    silicone;
    a material substantially uniformly dispersed throughout said silicone, said material having a density substantially greater than said silicone, said material having sufficiently low electrical conductivity for use in said mouse, said silicone and said material being mixed with sufficient amounts of each such that said spherical ball of predetermined size has sufficient weight to be used in said mouse.

11. A mouse as in claim 10 wherein said material is zirconium.

12. A mouse as in claim 11 wherein the composition of said ball is approximately 44% to 50% silicone and 56% to 50% zirconium.

13. A mouse as in claim 12 wherein said mouse ball is approximately 23 to 27 grams in weight.

* * * * *